United States Patent
Kishi et al.

(10) Patent No.: US 11,199,222 B2
(45) Date of Patent: Dec. 14, 2021

(54) MOTION GUIDE DEVICE

(71) Applicant: THK CO., LTD., Tokyo (JP)

(72) Inventors: Hiroyuki Kishi, Tokyo (JP); Mitsumasa Wada, Tokyo (JP); Hiroyoshi Yasutake, Tokyo (JP); Eriko Oshima, Tokyo (JP); Shinji Aoki, Tokyo (JP); Takuma Tsunoda, Tokyo (JP)

(73) Assignee: THK CO., LTD., Tokyo (JP)

( * ) Notice: Subject to any disclaimer, the term of this patent is extended or adjusted under 35 U.S.C. 154(b) by 16 days.

(21) Appl. No.: 16/643,055

(22) PCT Filed: Aug. 14, 2018

(86) PCT No.: PCT/JP2018/030266
§ 371 (c)(1),
(2) Date: Feb. 28, 2020

(87) PCT Pub. No.: WO2019/044493
PCT Pub. Date: Mar. 7, 2019

(65) Prior Publication Data
US 2020/0332833 A1 Oct. 22, 2020

(30) Foreign Application Priority Data

Aug. 29, 2017 (JP) .............................. JP2017-164378
Aug. 13, 2018 (JP) .............................. JP2018-152199

(51) Int. Cl.
*F16C 29/06* (2006.01)
(52) U.S. Cl.
CPC ...... *F16C 29/0609* (2013.01); *F16C 29/0611* (2013.01); *F16C 29/0645* (2013.01)
(58) Field of Classification Search
CPC .. F16C 29/06; F16C 29/0602; F16C 29/0604; F16C 29/0609; F16C 29/0611;
(Continued)

(56) References Cited

U.S. PATENT DOCUMENTS

| 4,850,720 A | 7/1989 | Osawa |
| 9,939,013 B2 * | 4/2018 | Matsumoto ......... F16C 29/0642 |

(Continued)

FOREIGN PATENT DOCUMENTS

| CN | 1756910 A | 4/2006 |
| CN | 1892059 A | 1/2007 |

(Continued)

OTHER PUBLICATIONS

International Search Report dated Oct. 30, 2018, issued in counterpart International Application No. PCT/JP2018/030266 (2 pages).

(Continued)

*Primary Examiner* — James Pilkington
(74) *Attorney, Agent, or Firm* — Westerman, Hattori, Daniels & Adrian, LLP

(57) ABSTRACT

A motion guide device includes: a track member including a rolling member rolling surface; a movable member including a loaded rolling member rolling surface, and a rolling member return passage; a pair of cap members including a direction change passage connecting the loaded rolling member rolling surface and the rolling member return passage; and a plurality of rolling members arrayed in a rollable manner on a loaded rolling member rolling passage, the rolling member return passage, and a pair of the direction change passages, the loaded rolling member rolling passage being made up of the rolling member rolling surface and the loaded rolling member rolling surface. A gap between the rolling member and the direction change passage at a boundary portion X is formed so as to become smaller than a gap between the rolling member and the rolling member rolling surface at the boundary portion.

6 Claims, 9 Drawing Sheets

(58) Field of Classification Search
CPC .............. F16C 29/0633; F16C 29/0635; F16C 29/0638; F16C 29/064; F16C 29/0642; F16C 29/0645; F16C 29/0647
See application file for complete search history.

(56) References Cited

U.S. PATENT DOCUMENTS

| | | | |
|---|---|---|---|
| 2003/0194160 A1 | 10/2003 | Tabe et al. | |
| 2005/0213856 A1* | 9/2005 | Geka | F16C 29/0609 384/45 |
| 2006/0213272 A1 | 9/2006 | Yoshioka et al. | |
| 2008/0212905 A1 | 9/2008 | Michioka et al. | |
| 2010/0226603 A1 | 9/2010 | Kawashima | |
| 2014/0254961 A1 | 9/2014 | Aoki et al. | |
| 2014/0363110 A1 | 12/2014 | Takahashi et al. | |
| 2017/0307011 A1 | 10/2017 | Aoki et al. | |
| 2018/0266486 A1 | 9/2018 | Kudo | |

FOREIGN PATENT DOCUMENTS

| | | | |
|---|---|---|---|
| CN | 101014778 A | | 8/2007 |
| CN | 101680483 A | | 3/2010 |
| CN | 103782047 A | | 5/2014 |
| CN | 106763175 A | | 5/2017 |
| JP | 2013-2625 A | | 1/2013 |
| JP | 2016-061389 A | | 4/2016 |
| WO | 2013/065663 A1 | | 5/2013 |
| WO | WO2016042702 | * | 3/2016 |
| WO | 2017/047747 A1 | | 3/2017 |

OTHER PUBLICATIONS

Office Action dated Nov. 4, 2020, issued in counterpart CN Application No. 201880056478.2, with Partial English Translation.

* cited by examiner

LINEAR PORTION
IS ADDED b < a

COMBINED R $R_2 < R_1, b < a$

R-CENTER IS OFFSET
b < a

PROTRUDING PORTION IS ADDED $b < a$

MOTION GUIDE DEVICE

CROSS-REFERENCE TO RELATED APPLICATIONS

This application is a U.S. national stage application of International Application PCT/JP2018/030266, filed Aug. 14, 2018, the entire contents of which are incorporated herein by reference. This application is also based upon and claims the benefit of priority of the prior Japanese Patent Application No. 2017-164378, filed on Aug. 29, 2017 and the prior Japanese Patent Application No. 2018-152199, filed on Aug. 13, 2018, the entire contents of which are incorporated herein by reference.

TECHNICAL FIELD

The present invention relates to an improvement of a motion guide device such as a linear guide that guides linear or curvilinear motion of a movable body such as a table.

BACKGROUND ART

A motion guide device has a rolling member, such as a ball or a roller, interposed in a guiding portion as a mechanical element for guiding linear motion or curvilinear motion of a movable body such as a table. This is because the motion guide device helps the movable body perform agile motion, the motion guide device is used in various fields including robots, machine tools, semiconductor and liquid-crystal production devices, and medical devices.

A linear guide, as one of the types of motion guide devices, includes a track rail mounted on a base, and a movable block mounted to the track rail to be capable of performing relative motion and mounted with a movable body. On the track rail, a rolling member rolling surface is formed and extends along the longitudinal direction. On the movable block, a loaded rolling member rolling surface is formed to face the rolling member rolling surface, and also a rolling member circulation passage is provided through which a rolling member is circulated. Rolling members are arrayed in a rollable manner between the rolling member rolling surface of the track rail and the loaded rolling member rolling surface of the movable block. When the movable block performs linear motion relative to the track rail, the rolling members arrayed between the track rail and the movable block perform rolling motion, and circulate around the rolling member circulation passage.

When the rolling-type motion guide device as described above is used, a plurality of rolling members need to be smoothly circulated while performing rolling motion within the rolling member circulation passage. Particularly, when the rolling members are present between the rolling member rolling surface of the track rail and the loaded rolling member rolling surface of the movable block, the rolling members perform rolling motion while being applied with a load between both the rolling member rolling surfaces. In contrast to this, the rolling members circulate in an unloaded state within the rolling member circulation passage provided in the movable block. That is, a plurality of rolling members perform rolling motion within an endless circulation passage made up of a loaded region and an unloaded region. Thus, if the rolling members cannot perform rolling motion smoothly on the boundary between the loaded region and the unloaded region, this increases wear of the rolling members and the rolling surfaces, or causes a reduction in service life.

As disclosed in, for example, Patent Literature 1 listed below, a motion guide device such as a linear guide according to the conventional technique proposes a technique to improve the shape of a scoop portion for smoothly scooping a rolling member in a state of moving from a loaded region to an unloaded region, focusing attention on this moving state of the rolling member.

CITATION LIST

Patent Literature

Patent Literature 1: International Publication No. WO 2013/065663

DISCLOSURE OF THE INVENTION

Problems to be Solved by the Invention

However, although the motion guide device according to the conventional technique, as typified by Patent Literature 1 listed above, has proposed the improved technique focusing attention on the state of the rolling member moving from a loaded region to an unloaded region, a proposed technique focusing attention on a rolling member when moving from an unloaded region to a loaded region has been inadequate. Particularly, in the technical field of recent motion guide devices, there has been increased demand for higher guiding motion speed and longer device life. Although the technique to improve smooth rolling motion of a rolling member when the rolling member moves from an unloaded region to a loaded region has not been closely considered before, if this technique can be proposed, this can enhance competitiveness and ensure a technical advantage in the technical field of motion guide devices.

The present inventors have completed the present invention in view of the above problems with the conventional technique, and an object of the present invention is to provide a technique in the technical field of a motion guide device such as a linear guide, in which a rolling member that endlessly circulates around an endless circulation passage performs smooth rolling motion when the rolling member moves from an unloaded region to a loaded region, so that it is possible to minimize the occurrence of wear of the rolling member and a rolling surface, and to achieve a reduction in noise level and extended device service life.

Means for Solving the Problems

A motion guide device according to the present invention includes: a track member including a rolling member rolling surface; a movable member including a loaded rolling member rolling surface facing the rolling member rolling surface, and including a rolling member return passage extending generally parallel to the loaded rolling member rolling surface; a pair of cap members provided at both front and rear ends of the movable member in a movement direction, and including a direction change passage connecting the loaded rolling member rolling surface and the rolling member return passage; and a plurality of rolling members arrayed in a rollable manner within an endless circulation passage made up of a loaded rolling member rolling passage, the rolling member return passage, and a pair of the direction change passages, the loaded rolling member rolling passage being made up of the rolling member rolling surface included in the track member and the loaded rolling member rolling surface included in the movable member, wherein a gap between the rolling member and the direction change passage at a boundary portion between the direction change passage and the loaded rolling member rolling passage is formed so as to become smaller than a gap between the rolling member and the rolling member rolling surface at a boundary portion between the direction change passage and the loaded rolling member rolling passage.

Effects of the Invention

The present invention enables the rolling member that endlessly circulates around the endless circulation passage to perform smooth rolling motion when the rolling member moves from the unloaded region to the loaded region. It is thus possible to provide a technique to minimize the occurrence of wear of the rolling member and the rolling surface, and to achieve a reduction in noise level and extended device service life.

BRIEF DESCRIPTION OF THE DRAWINGS

FIGS. 4(a) and 4(b) are explanatory views illustrating the state of a ball at a boundary portion between a direction change passage and a loaded rolling member rolling passage in the linear guide device serving as a motion guide device according to the present embodiment, in which FIG. 4(a) illustrates a partially cross-sectional perspective view of the linear guide device and FIG. 4(b) illustrates an enlarged view of a section denoted by a reference sign "a" in FIG. 4(a).

FIGS. 5(a), 5(b) and 5(c) are explanatory views illustrating the basic features of the linear guide device according to the present embodiment as compared to the conventional technique, in which FIG. 5(a) is a vertical cross-sectional view illustrating the state in which a ball that is a rolling member is positioned at the boundary portion between the direction change passage and the loaded rolling member rolling passage, when viewed in cross section perpendicular to the longitudinal direction of a track rail that is a track member, FIG. 5(b) illustrates an enlarged view of the shape according to the conventional technique in a section denoted by a reference sign "β" in FIG. 5(a), and FIG. 5(c) illustrates an enlarged view of the shape according to the present embodiment in the section denoted by the reference sign "β" in FIG. 5(a).

MODE FOR CARRYING OUT THE INVENTION

Hereinafter, a preferred embodiment for carrying out the present invention will be described with reference to the drawings. It should be noted that the embodiment below does not limit the invention as set forth in the claims. Further, it is not necessarily the case that all combinations of the features described in the embodiment are essential to the solving means of the invention.

Figure 1:
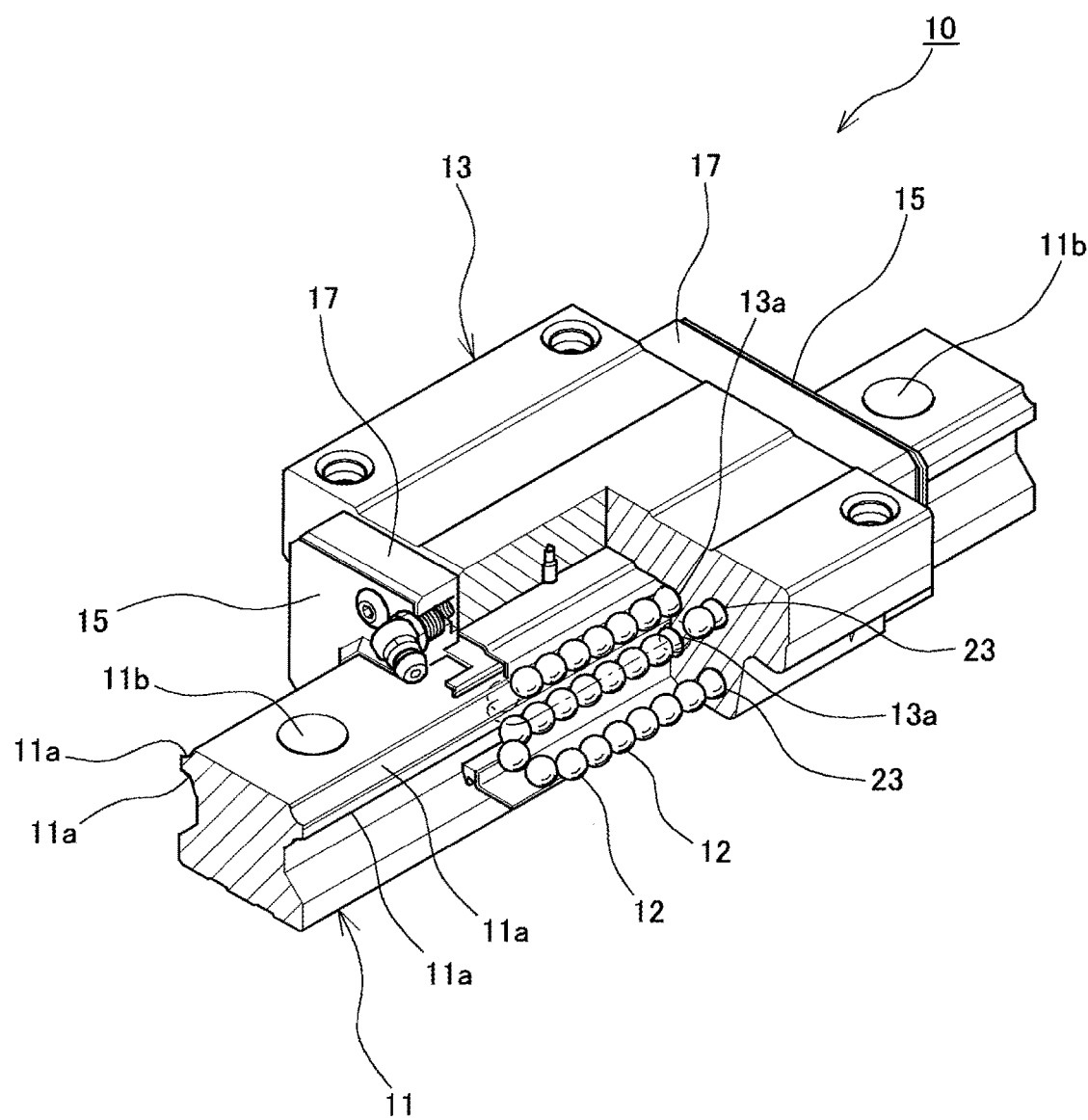
FIG. 1 is an exterior perspective view illustrating a configuration of a linear guide device according to an embodiment of the present invention.
Figure 2:
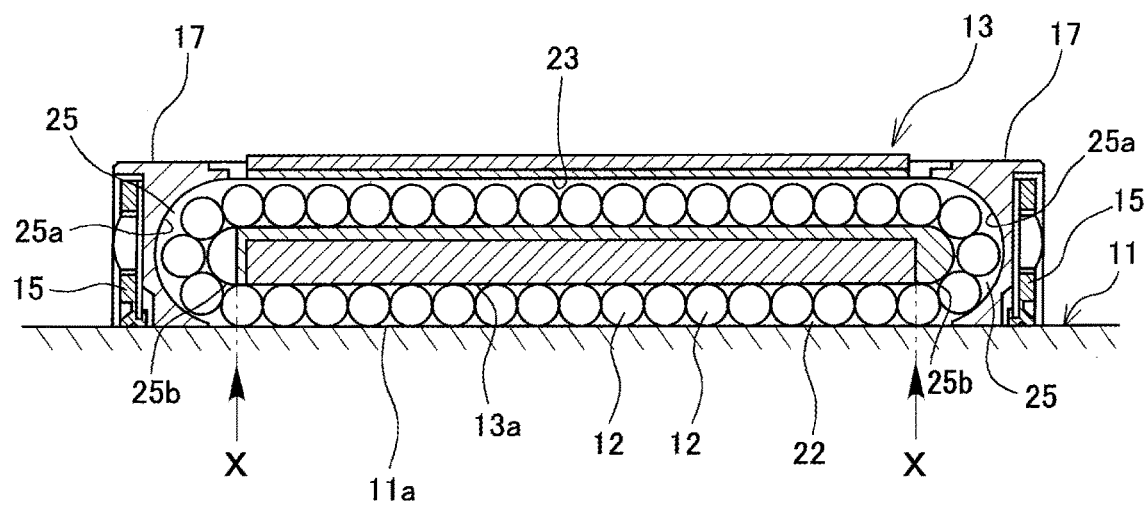
FIG. 2 is an explanatory cross-sectional view of an endless circulation passage included in the linear guide device illustrated in FIG. 1.
Figure 3:
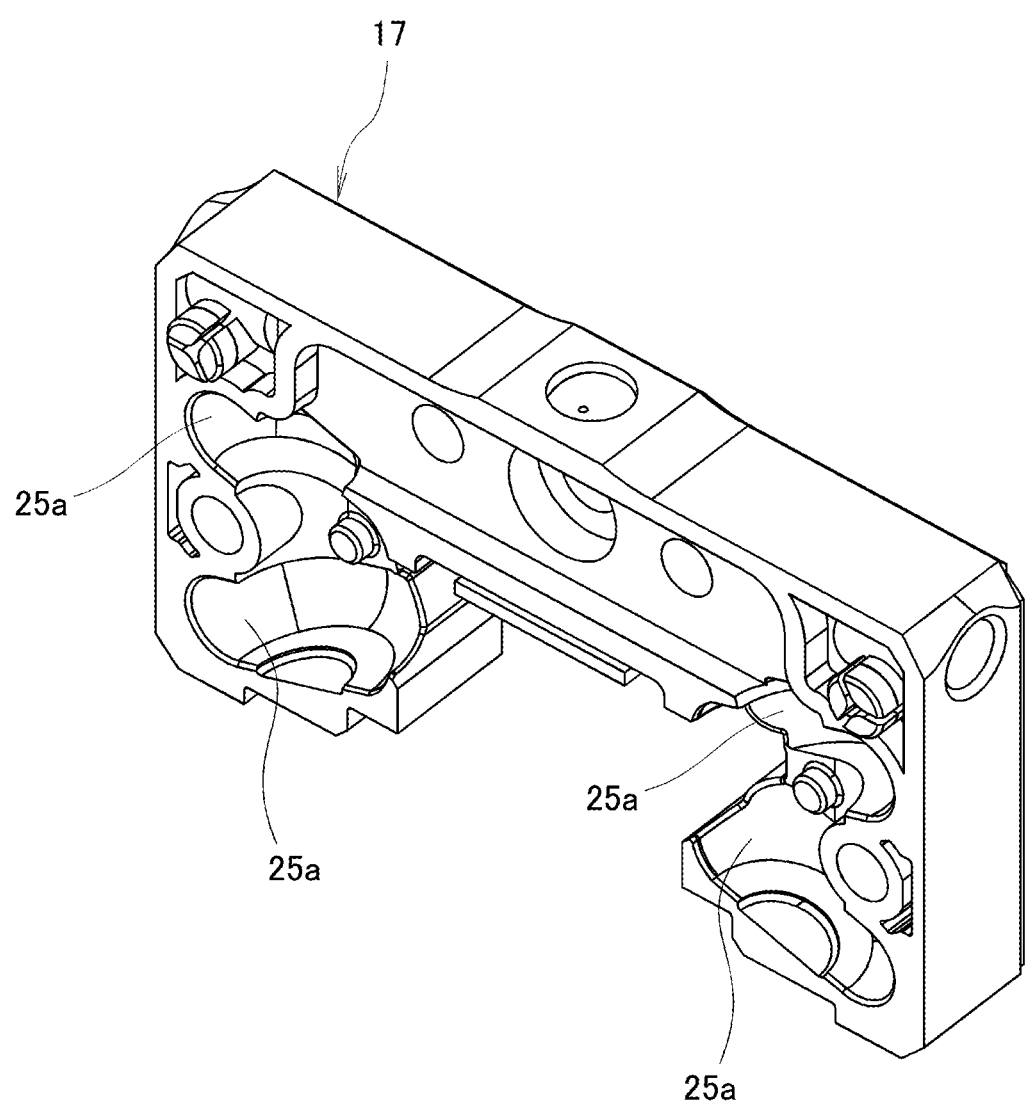
FIG. 3 is a perspective view of a single cap member according to the present embodiment when viewed from the upper side on the connection surface side of the cap member connected with a movable block.

First, the entire configuration of a linear guide device 10 serving as a motion guide device according to the present embodiment is described with reference to FIGS. 1 to 3. FIG. 1 is an exterior perspective view illustrating a configuration of the linear guide device according to the present embodiment. FIG. 2 is an explanatory cross-sectional view of an endless circulation passage included in the linear guide device illustrated in FIG. 1. FIG. 3 is a perspective view of a single cap member according to the present embodiment when viewed from the upper side on the connection surface side of the cap member connected with a movable block.

The linear guide device 10 serving as the motion guide device according to the present embodiment includes a track rail 11 serving as a track member, and a movable block 13 serving as a movable member and mounted to the track rail 11 slidably through balls 12 placed on the track rail 11 and serving as a plurality of rolling members. On the track rail 11, bolt holes 11b are formed at equal intervals to mount the track rail 11 onto a base by inserting a bolt serving as a mounting means from the upper surface to the lower surface of the track rail 11 through the bolt hole 11b. The track rail 11 can be fixed to the reference plane such as the base by using the bolt holes 11b. The track rail 11 is an elongated member formed into generally a rectangular shape in cross section perpendicular to its longitudinal direction. On the surface of the track rail 11, a rolling member rolling surface 11a is formed over the entire length of the track rail 11 to serve as a track surface on which the ball 12 rolls.

The track rail 11 may be formed so as to extend linearly or so as to extend in a curve. As illustrated in FIGS. 1 and 2, two rolling member rolling surfaces 11a are provided on each of the right and left sides, and the total number of the rolling member rolling surfaces 11a is four. However, the number of the rolling member rolling surfaces 11a can be changed to any number depending on the intended use of the linear guide device 10 and other factors.

Meanwhile, the movable block 13 is provided with a loaded rolling member rolling surface 13a serving as a track surface at a position corresponding to each of the rolling member rolling surfaces 11a. A loaded rolling member rolling passage 22 that is a loaded region for the ball 12 is formed by the rolling member rolling surface 11a of the track rail 11 and the loaded rolling member rolling surface 13a of the movable block 13. A plurality of balls 12 are interposed in the loaded rolling member rolling passage 22 with the balls 12 applied with a load. The movable block 13 is formed with four rolling member return passages 23 inside the movable block 13. The rolling member return passages 23 extend parallel to each of the rolling member rolling surfaces 11a.

Further, a pair of cap members 17 and 17 is located at opposite end portions of the movable block 13 in the movement direction. The pair of cap members 17 and 17 is provided with direction change passages 25, respectively. The direction change passage 25 is configured so as to connect the end of the rolling member return passage 23 and the end of the loaded rolling member rolling passage 22. Therefore, a single endless circulation passage is made up of a combination of a single loaded rolling member rolling passage 22 and a single rolling member return passage 23 with a pair of direction change passages 25 and 25 connecting the loaded rolling member rolling passage 22 and the rolling member return passage 23 (see FIG. 2). A rolling member circulation passage that is an unloaded region for the ball 12 is made up of the rolling member return passage 23 formed in the movable block 13 and the pair of direction change passages 25 and 25.

The balls 12 are placed on the endless circulation passage made up of the loaded rolling member rolling passage 22, the rolling member return passage 23, and the pair of direction change passages 25 and 25 in such a manner that the balls 12 are capable of circulating endlessly. This enables the movable block 13 to reciprocate relative to the track rail 11.

The pair of cap members 17 and 17 is provided respectively with a pair of sealing members 15 and 15 serving as a sealing member so as to seal the gap between the movable block 13 and the track rail 11 on the outer side of the pair of direction change passages 25 and 25. The sealing member 15 can include a lip portion at a section of the sealing member 15 in contact with the track rail 11. This lip portion or the sealing member 15 itself slidably contacts with the track rail 11 without a gap such that the dustproof effect can be given to the linear guide device 10.

Further, in the present embodiment, a return plate (not illustrated in FIGS. 1 and 2) is interposed between the movable block 13 and the pair of cap members 17 and 17. This return plate (not illustrated) has a first function of sealing the surface of the movable block 13 on which the cap member 17 is located and seals the gap between the movable block 13 and the cap members 17 to thereby play a role to improve hermetic sealing between the movable block 13 and the cap members 17. The return plate (not illustrated) is formed with an inner-peripheral-side passage surface 25b of the direction change passage 25, and thus has a second function of forming the direction change passage 25 by the passage surface 25b in cooperation with an outer-peripheral-side passage surface 25a formed in the cap member 17.

The entire configuration of the linear guide device 10 according to the present embodiment has been described in the foregoing. The characteristic configuration in the present embodiment is such a configuration in which a plurality of balls 12 can achieve smooth rolling motion when the balls 12 roll and move from the direction change passage 25 constituting the unloaded region of the endless circulation passage to the loaded rolling member rolling passage 22 constituting the loaded region of the endless circulation passage. Next, a characteristic configuration example of the linear guide device 10 according to the present embodiment is described in detail with reference to FIGS. 4(a) to 9.

Figure 4A:
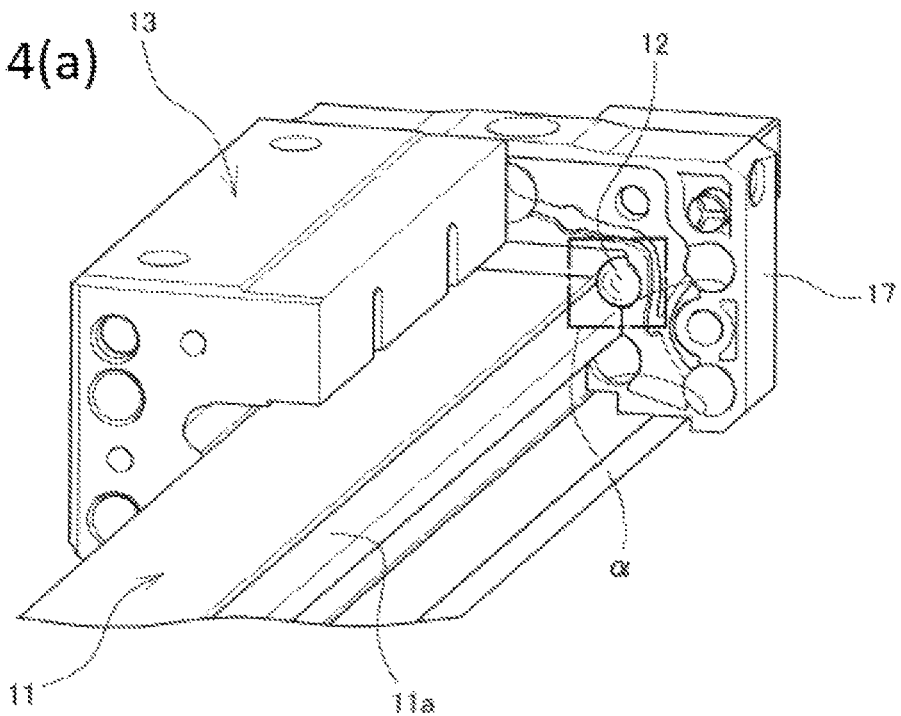
Figure 4B:
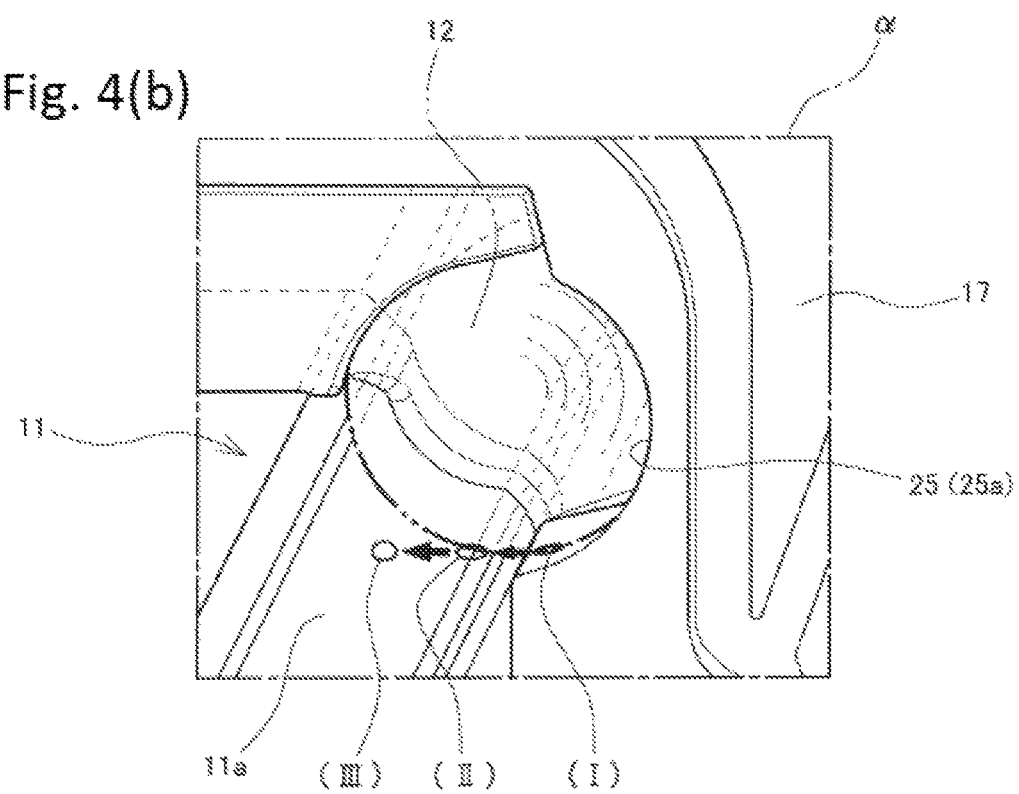
Figure 5:
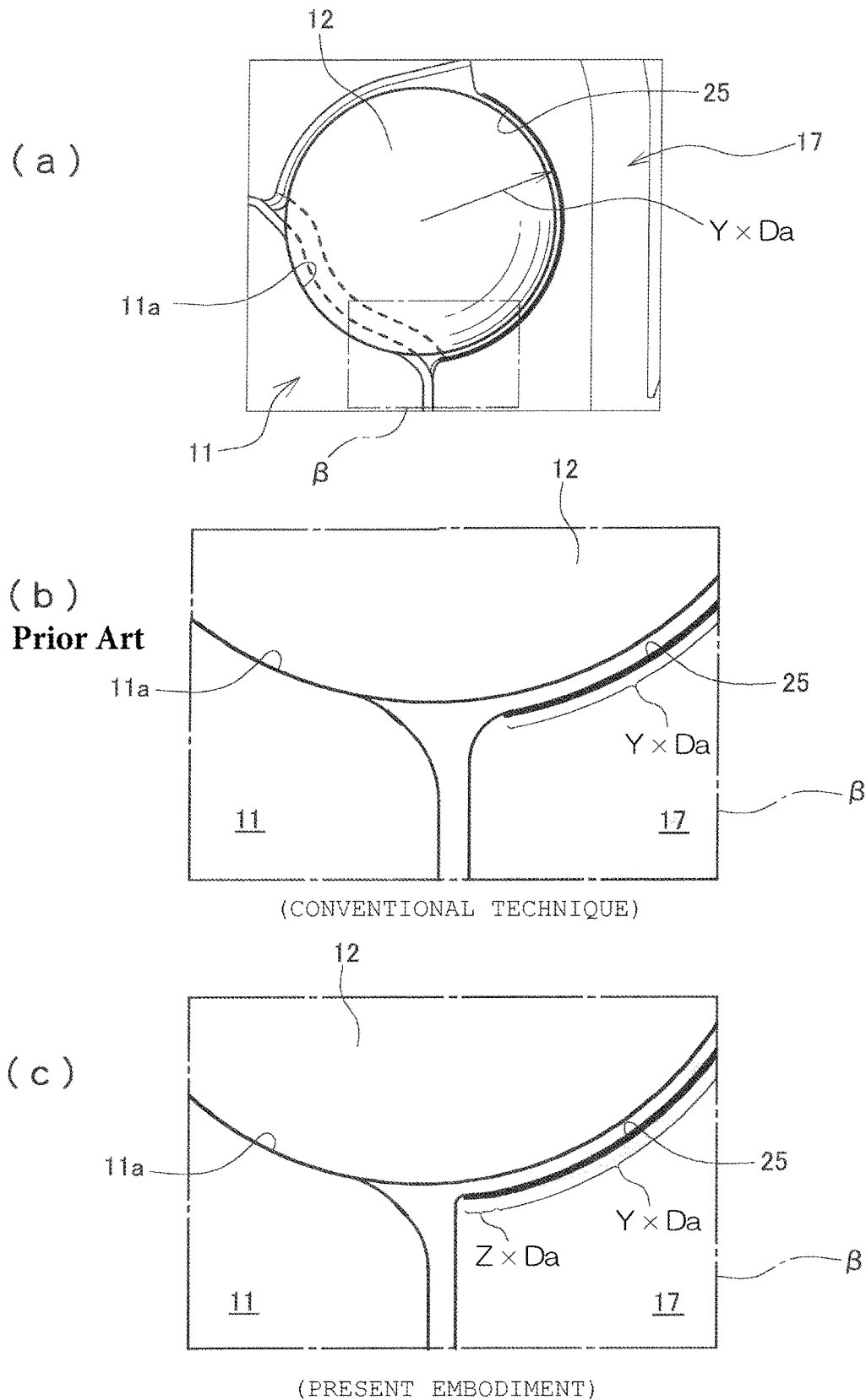

First, the basic features of the linear guide device 10 according to the present embodiment are described with reference to FIGS. 4(a), 4(b) and FIGS. 5(a), 5(b), 5(c) FIGS. 4(a) and 4(b) are explanatory views illustrating the state of a ball at a boundary portion between a direction change passage and a loaded rolling member rolling passage in the linear guide device serving as a motion guide device according to the present embodiment, in which FIG. 4(a) illustrates a partially cross-sectional perspective view of the linear guide device and FIG. 4(b) illustrates an enlarged view of a section denoted by a reference sign "α" in FIG. 4(a). FIGS. 5(a), 5(b) and 5(c) are explanatory views illustrating the basic features of the linear guide device according to the present embodiment as compared to the conventional technique, in which FIG. 5(a) is a vertical cross-sectional view illustrating the state in which a ball that is a rolling member is positioned at the boundary portion between the direction change passage and the loaded rolling member rolling passage, when viewed in cross section perpendicular to the longitudinal direction of a track rail that is a track member, FIG. 5(b) illustrates an enlarged view of the shape according to the conventional technique in a section denoted by a reference sign "β" in FIG. 5(a), and FIG. 5(c) illustrates an enlarged view of the shape according to the present embodiment in the section denoted by the reference sign "β" in FIG. 5(a).

First, by focusing attention on the ball 12 when the ball 12 moves from the direction change passage 25 that is an unloaded region to the rolling member rolling surface 11a that is a loaded region, the present inventors have examined the track of the ball 12 moving from the direction change passage 25 formed in the cap member 17 of the movable block 13 to the rolling member rolling surface 11a of the track rail 11. Results of the examination are illustrated in FIG. 4(b). The present inventors have found that along the track illustrated as reference signs (I)→(II)→(III) in FIG. 4(b), the ball 12 moves from the direction change passage 25 to the rolling member rolling surface 11a (the loaded rolling member rolling passage 22).

Next, the present inventors have examined the shape in a boundary portion X (see FIG. 2) between the direction change passage 25 and the loaded rolling member rolling passage 22, where the ball 12 that is a rolling member moves from the direction change passage 25 to the rolling member rolling surface 11a (the loaded rolling member rolling passage 22), when viewed in cross section perpendicular to the longitudinal direction of the track rail 11. The shape in the boundary portion X is illustrated in FIG. 5(a). The present inventors have examined the shapes of the ball 12, the direction change passage 25, and the rolling member rolling surface 11a in a general linear guide device according to the conventional technique. As illustrated in FIG. 5(b), in the conventional technique, it has become apparent that at the boundary portion X (see FIG. 2) between the direction change passage 25 and the loaded rolling member rolling passage 22, where the ball 12 moves from the direction change passage 25 to the rolling member rolling surface 11a, a gap between the ball 12 and the direction change passage 25 and a gap between the ball 12 and the rolling member rolling surface 11a are formed with almost equal clearance. It has also become apparent that this clearance creates a relatively large gap with respect to the ball diameter.

In general, the track rail 11, on which the rolling member rolling surface 11a is formed, is often made of iron-based metal material, while the cap member 17, in which the direction change passage 25 is formed, is often made of resin material. It is thus inevitable that greater manufacturing dimensional deviations are generated in the direction change passage 25 than in the rolling member rolling surface 11a. It has become apparent that due to the manufacturing constraints as described above, if a gap between the ball 12 and the direction change passage 25, and a gap between the ball 12 and the rolling member rolling surface 11a are formed with almost equal clearance, this generates rough motion of the ball 12 at immediately before the section where the ball 12 moves from the direction change passage 25 to the rolling member rolling surface 11a, and thus causes the ball 12 to impact the rolling member rolling surface 11a. As a solution to this case, it is conceivable that a gap between the ball 12 and the direction change passage 25, and a gap between the ball 12 and the rolling member rolling surface 11a are both formed with a smaller clearance.

However, it has become apparent from the experiments and studies by the present inventors that if the gap between the ball 12 and the direction change passage 25 and the gap between the ball 12 and the rolling member rolling surface 11a are both formed with a smaller clearance, then this increases the risk of a failure to pass the ball through the passage. It is thus undesirable for the device configuration.

The present inventors have found, as a result of earnest studies, that as illustrated in FIG. 5(c), the gap between the ball 12 and the direction change passage 25 at the boundary portion X (see FIG. 2) between the direction change passage 25 and the loaded rolling member rolling passage 22 is formed so as to become smaller than the gap between the ball 12 and the rolling member rolling surface 11a at the boundary portion X (see FIG. 2) between the direction change passage 25 and the loaded rolling member rolling passage 22, so that smooth rolling motion of the ball 12 can be achieved. It has also been found preferable that as an example of the specific design conditions as illustrated in FIGS. 5(a), 5(b) and 5(c), when the boundary section X (see FIG. 2) between the direction change passage 25 and the loaded rolling member rolling passage 22 is viewed in cross section perpendicular to the longitudinal direction of the track rail 11, a gap between the ball 12 and an end portion of a rolling surface of the direction change passage 25 included in the cap member 17, the end portion being closer to the rolling member rolling surface 11a included in the track rail 11 (that is, the lower end portion of the rolling surface of the direction change passage 25 on the drawing sheet in FIGS. 5(a). 5(b) and 5(c), is formed to be represented as Z×Da (Da represents a ball diameter, and Z is a numerical value that is a natural number equal to or greater than 1 and that satisfies the condition Z<Y), and also a gap between the ball 12 and the other section of the rolling surface (that is, the section including the opposite end portion to the end portion of the rolling surface closer to the rolling member rolling surface 11a included in the track rail 11, the opposite end portion being the upper end portion of a rolling surface of the direction change passage 25 on the drawing sheet in FIGS. 5(a), 5(b) and 5(c) is formed to be represented as Y×Da (Da represents a ball diameter, and Y is a numerical value that is a natural number equal to or greater than 1 and that satisfies the condition Y>Z). As illustrated in FIG. 5(c), the gap between the ball 12 and the direction change passage 25 at the boundary portion X (see FIG. 2) between the direction change passage 25 and the loaded rolling member rolling passage 22 is formed so as to become smaller than the gap between the ball 12 and the rolling member rolling surface 11a at the boundary portion X (see FIG. 2) between the direction change passage 25 and the loaded rolling member rolling passage 22. This prevents the ball 12 from performing rough motion that has conventionally occurred at immediately before the section where the ball 12 moves from the direction change passage 25 to the rolling member rolling surface 11a. It is thus possible to achieve smooth rolling motion of the ball 12. Therefore, in the present embodiment, it is possible to provide the motion guide device that can minimize the occurrence of wear of the ball 12 and the rolling surface, and can achieve a reduction in noise level and extended device service life.

The basic features of the linear guide device 10 according to the present embodiment have been described in the foregoing with reference to FIGS. 4(a), 4(b) and FIGS. 5(a). 5(b), 5(c). The scope of the present invention is not limited to the above embodiment, but can employ various modifications. Even when these modifications are employed, the same effects as those in the above embodiment can still be obtained. Next, various possible examples of the embodiment of the present invention are described additionally with reference to FIGS. 6 to 9.

Figure 6:
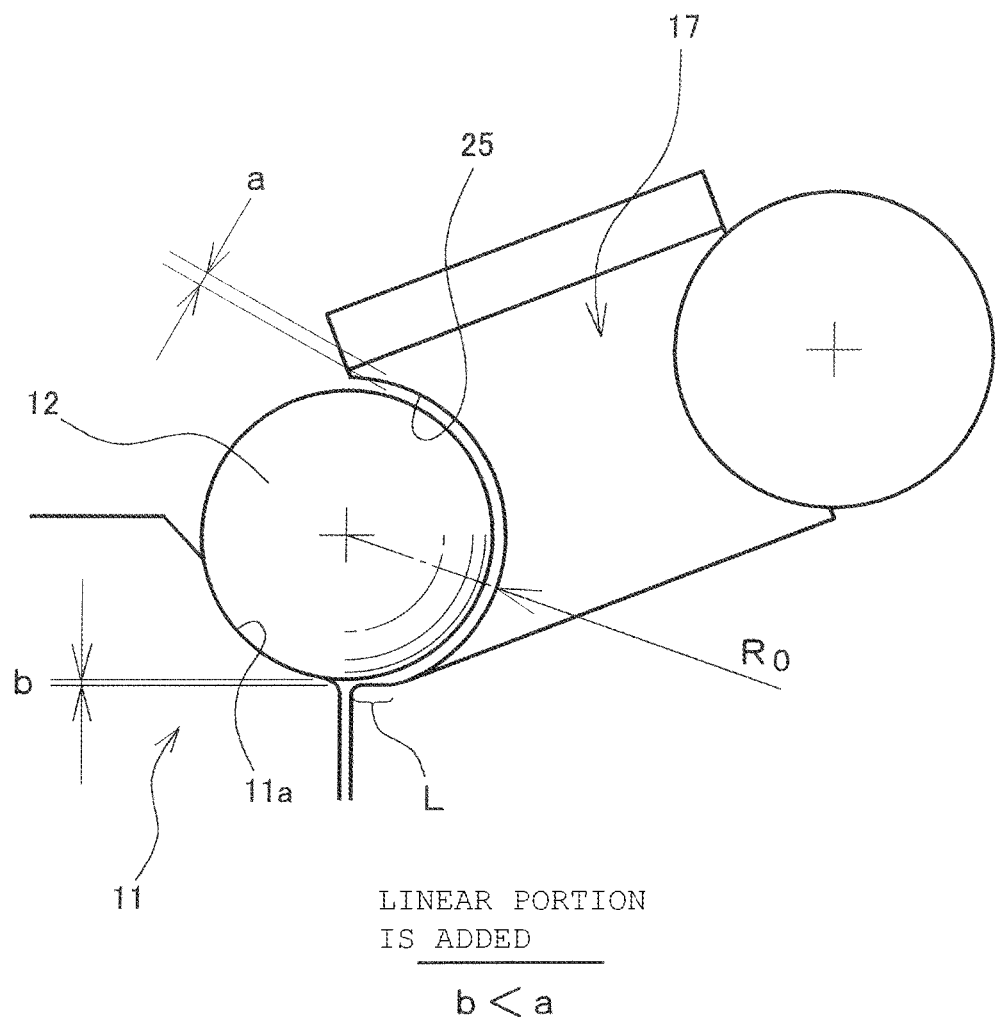
FIG. 6 is an explanatory schematic view of a configuration example of the linear guide device according to a first example of the embodiment.
Figure 7:
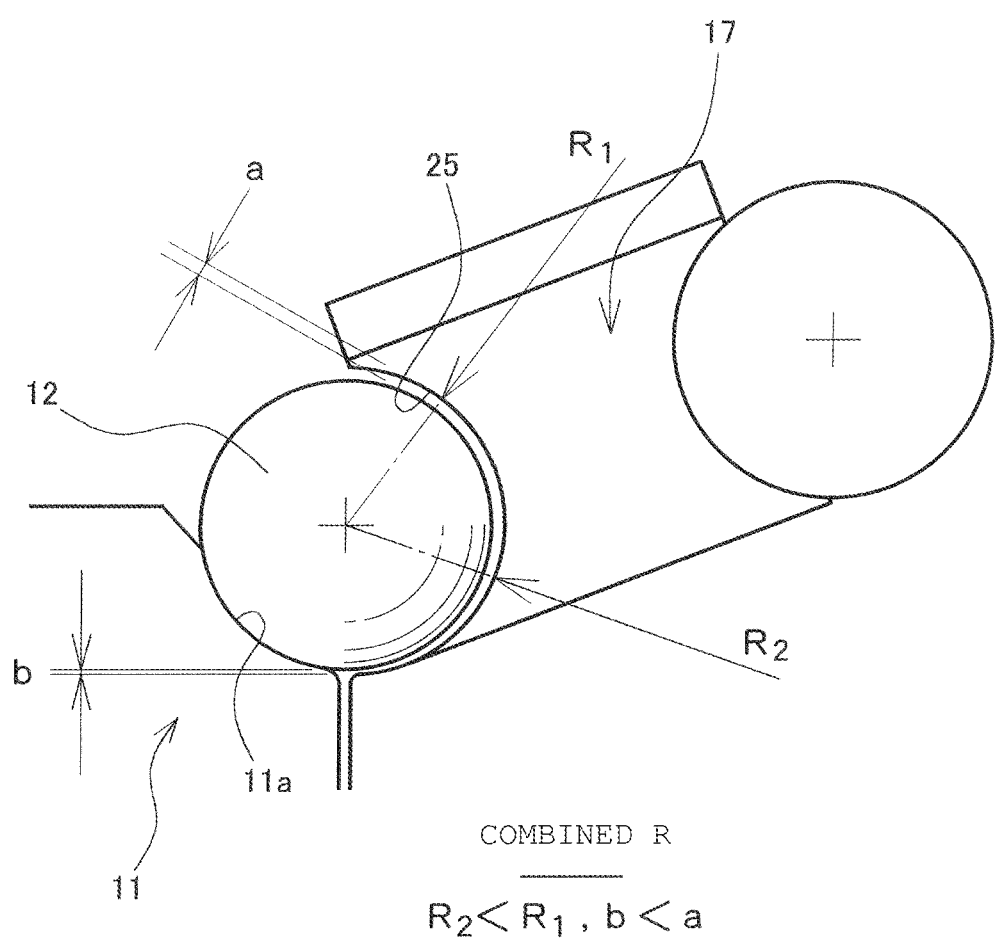
FIG. 7 is an explanatory schematic view of a configuration example of the linear guide device according to a second example of the embodiment.
Figure 8:
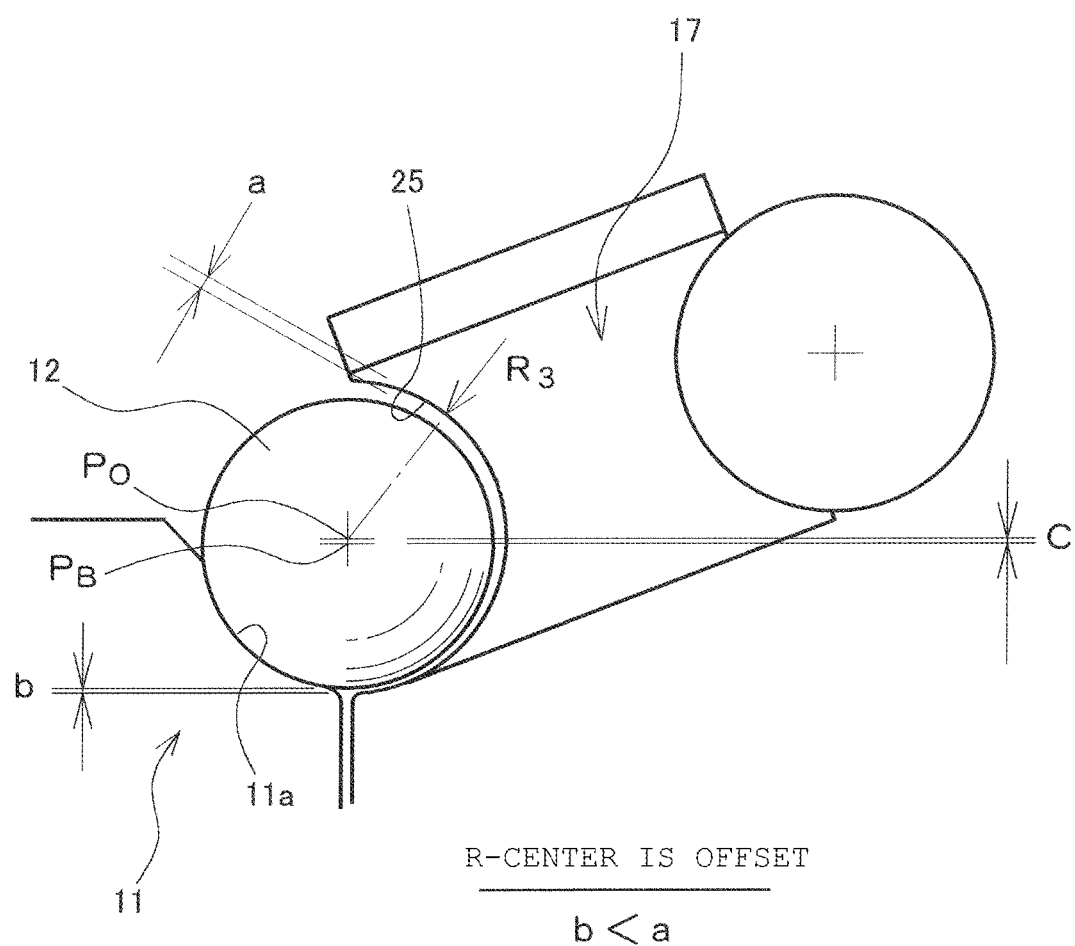
FIG. 8 is an explanatory schematic view of a configuration example of the linear guide device according to a third example of the embodiment.
Figure 9:
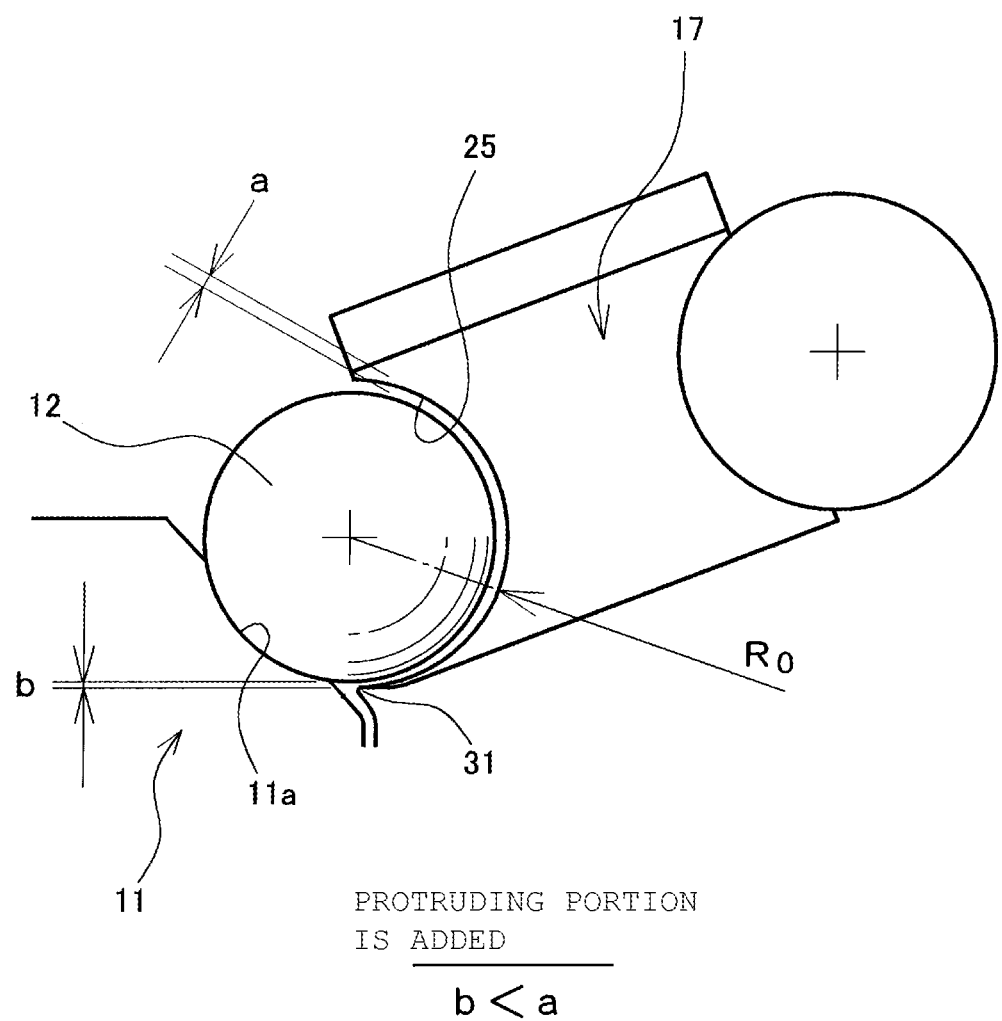
FIG. 9 is an explanatory schematic view of a configuration example of the linear guide device according to a fourth example of the embodiment.

FIG. 6 is an explanatory schematic view of a configuration example of the linear guide device according to a first example of the embodiment. FIG. 7 is an explanatory schematic view of a configuration example of the linear guide device according to a second example of the embodiment. FIG. 8 is an explanatory schematic view of a configuration example of the linear guide device according to a third example of the embodiment. FIG. 9 is an explanatory schematic view of a configuration example of the linear guide device according to a fourth example of the embodiment. FIGS. 6 to 9 are vertical cross-sectional views illustrating the same section as illustrated in FIGS. 5(a) and 5(c). In FIGS. 6 to 9, like or similar members to those described in the above embodiment are denoted by like reference numerals, and detailed descriptions thereof are omitted.

First, as a common feature between the first to fourth examples of the embodiment illustrated in FIGS. 6 to 9, the linear guide device 10 according to these first to fourth examples of the embodiment has a configuration feature in which the inequality expressed as b<a is satisfied when the boundary portion X (see FIG. 2) between the direction change passage 25 and the loaded rolling member rolling passage 22 is viewed in cross section perpendicular to the longitudinal direction of the track rail 11, where "a" is defined as a gap between the ball 12 and an end portion of a rolling surface of the direction change passage 25 included in the cap member 17, the end portion being on the opposite side (on the upper side of the drawing sheet in FIGS. 6 to 9) to an end portion of the rolling surface closer to the rolling member rolling surface 11a included in the track rail 11, and where "b" is defined as a gap between the ball 12 and the end portion of the rolling surface (on the lower side of the drawing sheet in FIGS. 6 to 9) closer to the rolling member rolling surface 11a included in the track rail 11. This feature allows the gap between the ball 12 and the direction change passage 25 to become smaller than the gap between the ball 12 and the rolling member rolling surface 11a similarly to the above embodiment. Smooth rolling motion of the ball 12 is achieved, and this makes it possible to obtain the effects of minimizing the occurrence of wear of the ball 12 and the rolling surface, and achieving a reduction in noise level and extended device service life.

Various design conditions can be employed in a configuration to concretely implement the common configuration feature achieved in the first to fourth examples of the embodiment illustrated in FIGS. 6 to 9. That is, the common configuration feature is such a feature in which the inequality expressed as b<a is satisfied when the boundary portion X (see FIG. 2) between the direction change passage 25 and the loaded rolling member rolling passage 22 is viewed in cross section perpendicular to the longitudinal direction of the track rail 11, where "a" is defined as a gap between the ball 12 and an end portion of a rolling surface of the direction change passage 25 included in the cap member 17, the end portion being on the opposite side (on the upper side of the drawing sheet in FIGS. 6 to 9) to an end portion of the rolling surface closer to the rolling member rolling surface 11a included in the track rail 11, and where "b" is defined as a gap between the ball 12 and the end portion of the rolling surface (on the lower side of the drawing sheet in FIGS. 6 to 9) closer to the rolling member rolling surface 11a included in the track rail 11. The design conditions are described below more specifically.

First, the linear guide device 10 according to the first example of the embodiment illustrated in FIG. 6 employs such a configuration in which the vicinity of an end portion of a rolling surface of the direction change passage 25 included in the cap member 17 is made to have a linear shape L, the end portion (on the lower side of the drawing sheet in FIG. 6) being closer to the rolling member rolling surface 11a included in the track rail 11. The rolling surface of the direction change passage 25 is made up of a combination of an arc shape of a single radius of curvature $R_0$ with the linear shape L, so that the above configuration in which the inequality expressed as b<a is satisfied can be implemented concretely. With this specific configuration feature, the linear guide device 10 according to the first example of the embodiment can minimize the occurrence of wear of the ball 12 and the rolling surface, and can achieve a reduction in noise level and extended device service life.

The linear guide device 10 according to the second example of the embodiment illustrated in FIG. 7 employs such a configuration in which a rolling surface of the direction change passage 25 included in the cap member 17 is made up of a combination of two arc shapes of different radii of curvature, and the inequality expressed as $R_2<R_1$ is satisfied, where $R_1$ is defined as a radius of curvature of one arc shape including an end portion of the rolling surface on the opposite side (on the upper side of the drawing sheet in FIG. 7) to an end portion of the rolling surface closer to the rolling member rolling surface 11a included in the track rail 11, and where $R_2$ is defined as a radius of curvature of the other arc shape including an end portion of the rolling surface (on the lower side of the drawing sheet in FIG. 7) closer to the rolling member rolling surface 11a included in the track rail 11. The rolling surface of the direction change passage 25 is made up of a combination of two arc shapes of different radii of curvature, so that the above configuration in which the inequality expressed as b<a is satisfied can be implemented concretely. With this specific configuration feature, the linear guide device 10 according to the second example of the embodiment can minimize the occurrence of wear of the ball 12 and the rolling surface, and can achieve a reduction in noise level and extended device service life.

The linear guide device 10 according to the third example of the embodiment illustrated in FIG. 8 employs such a configuration in which a rolling surface of the direction change passage 25 included in the cap member 17 is made to be an arc shape of a single radius of curvature $R_3$, and a center position $P_B$ of the ball 12 positioned on the rolling surface is offset from an arc center position $P_0$ of the arc shape constituting the rolling surface by a dimension C toward the end portion of the rolling surface closer to the rolling member rolling surface 11a included in the track rail 11. The center of the track of the ball 12 is offset relative to the rolling surface of the direction change passage 25 toward the rolling member rolling surface 11a (on the lower side of the drawing sheet in FIG. 8) in the vertically downward direction, so that the above configuration in which the inequality expressed as b<a is satisfied can be implemented concretely. With this specific configuration feature, the linear guide device 10 according to the third example of the embodiment can minimize the occurrence of wear of the ball 12 and the rolling surface, and can achieve a reduction in noise level and extended device service life.

The linear guide device 10 according to the fourth example of the embodiment illustrated in FIG. 9 employs such a configuration in which a protruding portion 31 protruding toward the track rail 11 is provided in the vicinity of an end portion of a rolling surface of the direction change passage 25 included in the cap member 17, the end portion (on the lower side of the drawing sheet in FIG. 9) being closer to the rolling member rolling surface 11a included in the track rail 11. The protruding portion 31 protruding toward the track rail 11 from the end portion of the rolling surface of the direction change passage 25 is formed, so that the above configuration in which the inequality expressed as b<a is satisfied can be implemented concretely. Particularly, this configuration is useful in a case where the size of the linear guide device 10 is increased, because this configuration properly prevents the ball 12 from performing rough motion at immediately before the section where the ball 12 moves from the direction change passage 25 to the rolling member rolling surface 11a, and it is thus possible to achieve smooth rolling motion of the ball 12. With this specific configuration feature, the linear guide device 10 according to the fourth example of the embodiment can minimize the occurrence of wear of the ball 12 and the rolling surface, and can achieve a reduction in noise level and extended device service life.

Although a preferred embodiment of the present invention has been described in the foregoing, the technical scope of the present invention is not limited to the scope set forth in the above embodiment. Various changes or improvements may be made to the above embodiment.

For example, although in the embodiment and multiple examples of the embodiment described above, the case where a ball is used as a rolling member has been described, any form of rolling member such as a roller or rolling element may be used as the rolling member according to the present invention.

For another example, although in FIGS. 4(a) to 9, the present invention has been described using only the rolling member rolling surface 11a provided on the upper side of the track rail 11 among the total four rolling member rolling surfaces 11a, with two provided on each of the right and left sides of the track rail 11, the present invention may also be applicable to the rolling member rolling surface 11a provided on the lower side of the track rail 11. It should be noted that the present invention may be applied to the rolling member rolling surface 11a provided on the lower side of the track rail 11 under the condition that the rolling member rolling surface 11a provided on the upper side as described above is vertically inverted.

It should be clear from the claims that configurations to which other various changes or improvements have been added are within the technical scope of the present invention.

REFERENCE NUMERALS

10 Linear guide device, 11 Track rail, 11a Rolling member rolling surface, 11b Bolt hole, 12 Ball, 13 Movable block, 13a Loaded rolling member rolling surface, 15 Sealing member, 17 Cap member, 22 Loaded rolling member rolling passage, 23 Rolling member return passage, 25 Direction change passage, 25a Outer-peripheral-side passage surface, 25b Inner-peripheral-side passage surface, 31 Protruding portion, X Boundary portion.

The invention claimed is:
1. A motion guide device comprising:
a track member including a rolling member rolling surface;
a movable member including a loaded rolling member rolling surface facing the rolling member rolling sur- face, and including a rolling member return passage extending generally parallel to the loaded rolling member rolling surface;

a pair of cap members provided at both front and rear ends of the movable member in a movement direction, and each of the pair of cap members including a direction change passage connecting the loaded rolling member rolling surface and the rolling member return passage; and a plurality of rolling members arrayed in a rollable manner within an endless circulation passage made up of a loaded rolling member rolling passage, the rolling member return passage, and a pair of the direction change passages passage of each of the pair of cap members, the loaded rolling member rolling passage being made up of the rolling member rolling surface included in the track member and the loaded rolling member rolling surface included in the movable member, wherein in a cross-sectional view perpendicular to a longitudinal direction of the track member, the cross-sectional view including the rolling member being positioned at a boundary portion between the direction change passage and the loaded rolling member rolling passage, a first gap between the rolling member and a first end portion of a rolling surface of the direction change passage closest to the rolling member rolling surface included in the track member in the cross-sectional view is smaller than a gap between the rolling member and the rolling member rolling surface closest to the first end portion of the rolling surface of the direction change passage in the cross-sectional view.

2. The motion guide device according to claim 1, wherein an inequality expressed as b<a is satisfied in the cross section view, where "a" is defined as a dimension of a second gap between the rolling member and a second end portion of the rolling surface of the direction change passage in the cross-sectional view, the second end portion being on an opposite side to the first end portion of the rolling surface of the direction change passage, and where "b" is defined as a dimension of the first gap between the rolling member and the first end portion of the rolling surface of the direction change passage.

3. The motion guide device according to claim 2, wherein a region of the rolling surface of the direction change passage adjacent to the first end portion of the rolling surface of the direction change passage has a linear shape.

4. The motion guide device according to claim 2, wherein the rolling surface of the direction change passage has two arc shapes of different radii of curvature, and an inequality expressed as $R_2<R_1$ is satisfied, where $R_1$ is defined as a radius of curvature of one arc shape including the second end portion of the rolling surface of the direction change passage, and where $R_2$ is defined as a radius of curvature of the other arc shape including the first end portion of the rolling surface of the direction change passage.

5. The motion guide device according to claim 2, wherein the rolling surface of the direction change passage has an arc shape of a single radius of curvature $R_3$, and a center position $P_B$ of the rolling member, in the cross-sectional view, is offset from an arc center position $P_O$ of the arc shape constituting the rolling surface towards the first end portion of the rolling surface of the direction change passage.

6. The motion guide device according to claim 1, wherein a protruding portion protruding toward the track member is provided at the first end portion of the rolling surface of the direction change passage.

* * * * *